April 3, 1951 W. D. HUSTON ET AL 2,547,009

TELEMETERING SYSTEM

Filed Oct. 17, 1944 2 Sheets-Sheet 1

INVENTOR.
JAMES M. BRADY
WILLIAM D. HUSTON
BY
William D. Hall
ATTORNEY

INVENTOR.
JAMES M. BRADY
WILLIAM D. HUSTON
BY Harry M. Saragovitz
ATTORNEY

Patented Apr. 3, 1951 2,547,009

UNITED STATES PATENT OFFICE 2,547,009

TELEMETERING SYSTEM

William D. Huston, Cranford, N. J., and James M. Brady, Washington, D. C., assignors to the United States of America as represented by the Secretary of War Application October 17, 1944, Serial No. 559,108

9 Claims. (Cl. 177—380)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to telemetering systems and more particularly to the telemetering systems which use a disc for transmitting the necessary messages.

In the systems of this type, a reproducing arm mounted in reproducing relationship with respect to a signal-transmitting portion of the disc may be connected to any instrument which is capable of changing the angular position of the arm with respect to the disc. Although the invention is not limited to any particular type of measurements, it will be illustrated in connection with the transmission of meteorological data, in which case the reproducing arms are connected to the meteorological instruments, such as humidity, temperature, pressure, wind velocity-and-direction instruments.

The invention may be considered as an improvement of a telemetering system disclosed in the U. S. application for patent, Serial No. 492,334 of James M. Brady, filed June 25, 1943, now Patent No. 2,526,631, and titled "Telemetering Systems," which discloses a system for transmitting meteorological data with the aid of a phonograph disc and a plurality of reproducing arms connected to the meteorological instruments. Since, in the above-mentioned application, only one disc is used for actuating all of the reproducing arms, commutating means is used for connecting one reproducing arm at a time to the transmitter for keying it. The readings of the instruments are thus transformed into code signals recorded in the concentric grooves of the disc.

Since in such system the arms can not be actuated or shifted angularly by the instruments as long as the reproducing needles of the arms rest within any particular groove, it becomes necessary to disengage the arms periodically from the disc in order to allow the arms to assume the angular position corresponding to the physical state of the instruments. The previously identified application provides mechanical cams which lift and lower the record periodically, thus engaging and disengaging the reproducing arms with the disc, all arms engaging the disc simultaneously when the cam raises the disc. The disc-raising mechanism requires a number of mechanical elements which complicate the structure and increase its weight. Accordingly, because of the relatively complicated nature of the mechanical elements and their aggregate weight, the system disclosed in the prior application is not suitable for radiosonde use.

The present invention solves many mechanical difficulties inherent with the previously disclosed system by elevating a portion of the disc used for transmitting the code message, and by depressing the remaining portion of the disc so that the recording arms come into contact with the disc only when the raised sector of the disc comes into contact with the reproducing element of the arm. The height of the raised sector is made so that the arms are free to change their angular position with respect to the disc as long as they are over the depressed portion of the disc, and become fixed only for a limited length of time upon engaging the raised sector, the time being determined by the angle spannned by the raised sector and the angular velocity of the disc. As in the previously identified application of Brady, a code, such as Morse, Baudot or audio frequency code, is used for identifying any particular groove on the raised sector. Ordinarily the grooves are concentrically disposed with respect to the center of the record so that the grooves themselves do not change the angular position of the reproducing arms with respect to the disc.

The advantages of the telemetering system using a record provided with the raised sector are two fold: first, the mechanical elements necessary for engaging and disengaging the reproducing arms with the disc become unnecessary; and, second, the same is true of the commutating system, which is otherwise necessary for connecting only one arm at a time to the transmitter. It is obvious that the raised sector of the disc solves these two limitations present in the known systems in a simple and positive manner, making it possible to use a system of this type for transmitting the meteorological data from the radiosonde. This increases the applicability of the systems using the phonograph records.

It is therefore the principal object of this invention to provide a telemetering system which uses a phonograph record with a raised sector for transmitting the intelligence.

It is an additional object of this invention to provide reproducing arms simple in structure and light in weight which could be suitably used in connection with the phonograph record provided with a raised sector, the grooves on the raised sector bearing the recorded code for identifying the grooves and the angular position of the reproducing arms with respect to the phonograph record.

The novel features which we believe to be characteristic of our invention are set forth with particularity in the appended claims. Our invention itself, however, both as to its organization and method of operation, together with further objects and advantages thereof, may best be understood by references to the following description taken in connection with the accompanying drawings in which:

Figure 1 is a block diagram of the telemetering system.

Figures 2 to 6 illustrate phonograph records with the raised sectors, Figs. 2 to 5 having a single raised sector while Fig. 6 illustrates a record with two raised sectors.

Figures 7, 8, 9 and 10 illustrate several types of the reproducing arms especially suitable for the application outlined in this specification.

Figures 1, 2, 3, 4, 5, 6, 7, 8:
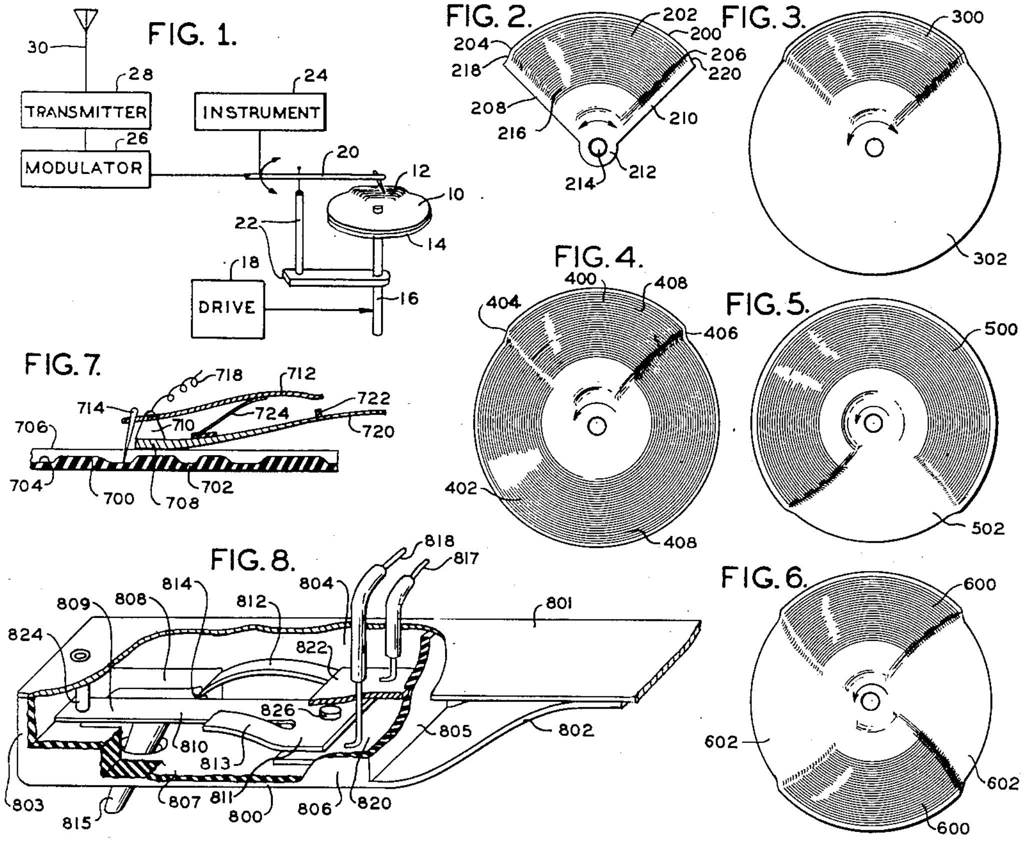

Referring now to Fig. 1, a phonograph disc 10, with a raised sector 12, is mounted on a turn table 14, the turn-table being connected to a shaft 16. Shaft 16 is connected to a drive 18, which may be an electric motor in the case of ground systems, and a gravity motor or a windmill in the case of a radiosonde. A reproducing arm 20 is mounted on brackets 22, the level of the arm being adjusted so that it is in reproducing engagement with sector 12, but is freely suspended from its pivot when the disc turns and puts the depressed portion 10 of the disc under the arm. During this period the arm is free to change its angular position and to follow the readings of an instrument 24 to which it is connected by appropriate levers. The possible directions of travel of the arm are illustrated by a double arrow in the drawing. The arm is connected to a modulator 26, which follows the code signals impressed upon it by the arm when the latter engages the raised sector. The modulator keys a transmitter 28, and the latter transmits the code over an antenna 30. Only one reproducing arm 20 is illustrated in Fig. 1 for the sake of simplicity of the drawing, the use of a plurality of arms with the record of this type being illustrated in Fig. 11.

Referring now to Fig. 2, it discloses a sector 200 of a phonograph disc, with a raised flat portion 202, which begins at flowing edges 204 and 206 of the sector. The depressed portions of the sector are illustrated at 208, 210 and 212, the latter being provided with a hole 214 which engages the well known disc-centering pin of the turn table. The raised sector 202 of the disc is provided with a plurality of concentric grooves 216; a Morse, Baudot, audio frequency, or any other type of code is recorded within the grooves for identifying each particular groove. Either hill-and-dale or lateral method of recording may be used, the record embedded in each groove identifying it to the operator at the receiver. When the reproducing arm changes its angular positions with respect to sector 200 because of their actuation by the instruments, it engages some specific groove on the sector, and transmits the code of the groove to the operator at the receiver who identifies the angular position of the transmitting arm and the reading of the instrument by means of a calibration chart. When sector 24 is rotated through the angle it spans, the reproducing arm disengages the sector, and is thus freed for its subsequent actuation by the instrument. From the description given thus far, it follows that the suspension of the reproducing arms is adjusted so that they come into proper reproducing engagement with the sector, and find themselves freely suspended in the air upon being disengaged from the sector. It is this free state of the arms during the inactive period, that is used to change their angular position by means of their respective instruments.

The angle spanned by the sector is determined to a very large extent by the number of the reproducing arms used in connection with any given sector, and the type of signal used for transmitting the intelligence. The larger is the number of the reproducing arms used with one sector, the smaller is the angle spanned by the sector. This is the case because it is preferable to adjust this sector so that only one reproducing arm engages the sector at any given time, thus avoiding the confusion which may otherwise arise should the sector be made so large that two arms key the transmitter simultaneously.

Fig. 2 illustrates the preferred form of the sector since because of the limited angle it spans, it does not require any commutator for connecting one reproducing arm to the transmitter. As mentioned previously, either Morse, Baudot or audio frequency code may be used for identifying the respective grooves, and any of these codes is suitable for its use in connection with the sector illustrated in Fig. 2 as long as the angular velocity of the sector is such that the recorded frequencies may be reproduced by the reproducing arms and the transmitter. When the frequencies include very low frequency components, and the rotation of the sector is relatively slow, it is obvious that their reproduction by means of such a limited sector becomes rather difficult. When this is the case, a wider sector, such as that illustrated in Fig. 5, may be used.

In Fig. 5 the active sector has been enlarged to a very large extent so that it now spans an angle in the order of 240°–280°. When only one reproducing arm is used in connection with such record the suggested arrangement is not especially objectionable since under such circumstances it will not require any commutator. Nevertheless, a large active sector has an inherent limitation: since the reproducing arm is held in a fixed angular relationship with respect to the disc over the entire active sector of the disc, the arm is free for its actuation by the instrument only during a short interval of time so that the consequentive readings of the instrument may lag. Accordingly, the use of the record of this type is recommended only when the code frequencies and the angular values of the discs are such as to call for large active sectors.

Referring once more to Fig. 2, it illustrates the depressed portions 208, 210 of the sector, these portions supporting the disc when it is mounted on a turn table, and for gradually lifting the arm onto the groove. It is obvious that the sector may be supported altogether by means of washer 212 and therefore the necessity of having the depressed portions for supporting the record is optional. However, gradual lifting of the reproducing arm onto the groove can not be dispensed with. When the reproducing arm begins to engage the sector, the normal "in air" position of the needle of the reproducing arm is such that it is below the level of the grooves, this low level position being necessary so that the weight and the springing action of the arm would exert sufficient pressure on the disc for proper actuation of the arm after it engages the disc. There is a period, therefore, when the reproducing arm is being raised by the slope 218 or 220 of the sector, depending upon the direction of rotation, and if the slope itself does not introduce any lateral or shifting force against the arm at this instant, the arm will engage the groove corresponding to the reading of the instrument. However, since the arm may not be at right angles to the slope over the entire arc over which it is swung by the instrument, it is obvious that the slope will introduce the shifting or side-swiping force when the arm begins to engage the disc, the magnitude of this force being the greater, the greater is the deviation of the needle from its normal position (90°) to the slope. The invention discloses two methods of solving this problem, and the one illustrated in Fig. 2 consists of extending the grooves over the slopes 218, 220 so that the grooves instantly arrest any lateral movement of the reproducing arm whenever such is present. The second solution of the same problem is illustrated in Fig. 4 where the raised sector 400, and especially the sloped region 404, 406, which join the flat, raised sector 400 and the flat, depressed sector 402, are curved, the radius of curvature being equal to the radius of the reproducing arm and coinciding with the center of suspension of the arm at the instant when the needle engages the slope so that the needle of the arm is at right angle to the line drawn on said slope at the point of contact by a plane perpendicular to the direction of travel of said needle. When this is the case, the presence of any lateral forces is avoided, and the arm will engage the proper groove on the raised sector even if the reproducing grooves do not extend into the flat portion 402 and over the sloped portions 404 and 406 of the disc. Besides illustrating the curved sloped regions 404 and 406, Fig. 4 also illustrates the grooves 408 which extend over the entire disc, and form a plurality of concentric circles. When the grooves as well as the curved sloped surfaces are used with the same disc, the two anti-side-swiping features are combined.

Fig. 3 discloses a disc equipped with the raised segment, such as that illustrated in Fig. 2, the only structural difference between the two residing in the fact that, while in Fig. 2 only a segment of a disc is used as a structural member, in Fig. 3 the segment has been combined with the complementary segment to form a disc. The disk with the raised sector 300 illustrated in Fig. 3 may offer certain advantages, especially when the disc is mounted on a turn table. In this type of disc mounting a large depressed portion 302 of the disc forms good support and leveling surface for the entire record which may be more positive and is less apt to produce any mechanical misalignments between the disc and the reproducing arms than the structure illustrated in Fig. 2.

In Fig. 6 a disk is illustrated having two raised sectors separated by two depressed sectors to provide twice the number of cycles of transmitted data per one revolution of the disk. With the disks of this type, only one reproducing element or arm may be used without resorting to the previously mentioned commutations, since the use of a plurality of arms without commutation would create confusion of the arms at the receiver. The disk of this type offers a method of obtaining twice the rate of data transmission for one element without increasing the power consumption required for rotating the disk against the friction of the needle.

Figs. 7 to 10 have several types of reproducing arms which may be used in connection with the records illustrated in Figs. 2 to 6. Generally speaking, it is obvious that the arms suitable for radiosonde use must be very light, mechanically simple, and inexpensive to manufacture, since as many as four or five arms may be used in connection with one radiosonde which may be lost after only one use.

Fig. 7 illustrates the arm which may be used in connection with either lateral or hill-and-dale record provided with Morse, Baudot or pulse code signals, the figure illustrating this record as hills 700 and dales 702 embedded in a groove 704, 704 designating the bottom and 706 the top of the groove. As shown in the figure, the arm is provided with a block 708 which slides over the top portion of the record, the block also acting as a support for a bracket 710 used for pivoting a lever arm 712. Lever arm 712 comprises a light, metallic spring equipped with a needle 714, bracket 710 insulating the lever arm from conductor 720. The lever arm forms a lever of the first kind which opens and closes the circuit connected to a conductor 718, contact 722, and conductive arm 720. The lever arm is held in engagement with the record by means of a spring 724. The hill-and-dale portions 700, 702 of the record swing the lever arm 712 and close and open contact 722, thus, keying the modulator 26, Fig. 1.

The reproducing arm 720, which represents the pivoted arm connected to the meteorological instrument, is made of metal and acts as a spring for holding block 708 in engagement with the disc so that the needle does not lift the entire reproducer and arm 720 when it strikes hill 700 but acts only against the tension of spring 724 which is much weaker than the pressure exerted on block 708 by spring 720. Therefore, arm 712 positively engages contact 722 upon the actuation of needle 714 by hill 700. The lever advantage used in connection with the lever arm 712 is such that arm 712 strikes contact 722 before needle 714 reaches the flat portion of hill 700 and further upper travel of the needle results in bending of the right part of arm 712, which acts as a relatively weak flat spring. This type of arrangement facilitates obtaining positive electrical contact between arm 712 and contact 722.

In Fig. 8, closing and opening of contacts is accomplished by means of a reproducing element provided with a switch having a snap-action. The switch consists of a box 800 attached to a metal strip 801, the strip forming a spring holding box 800 in sliding engagement with the record, a reproducing arm, and a conductor which is used for connecting one side of the switch to a circuit to be keyed by the switch. The leading portion 802 of the box is curved for facilitating the engagement between the raised sector and the reproducer, spring 801 holding the reproducer partially below the level of the raised disc when the arm is above the depressed portion of the disc. Because of this type of suspension, the pressure exerted on the disc by the reproducing arm consists of the pressure exerted by spring 801, and the pressure exerted by the weight of the entire combination. Such combined pressure is desirable since the reproducer itself may have such small weight as to exert insufficient pressure on the record if the weight of the reproducer were the only force exerting this pressure. Box 800 includes four walls 803, 804, 805 and 806, a "floor" portion 807, and a curved portion 802, all of these elements comprising one piece made of any suitable plastic material such as, "polystyrene." This plastic structure also includes the U-shaped shelf 808 which is used for holding a T-shaped spring 809 in the desired relationship with respect to the remaining elements of the switch. The spring consists of a central element 809, a cross member 811, and two side members 812 and 813 acting as two flat springs which are held in arched positions by member 809. This spring is fastened to shelf 808 by a stud 824, and the V-shaped grooves in the U-shaped shelf 808, only one groove, grove 814, appearing in the drawing, the other groove as well as a portion of the flat spring 813 being cut away to illustrate the connection between the central member 809 and the reproducing needle 815. Needle 815, which is preferably a metal needle, is connected to the central member 809 by any suitable hard cement. Conductors 817 and 818, which, may be connected to positive and negative sources of potential respectively, are connected to two metal plates 820 and 822 which are held in fast relationship with respect to box 800 by being wedged against the walls 804, 806 and 805. The lengths of the central member 809 and of the side springs 812 and 813, as well as the height and the length of the U-shaped shelf 808, are so adjusted that the entire spring member 809—811—812—813 normally rests on the lower plate 820 of the spring, plate 820 being mounted on that level with respect to spring 809 which puts it only slightly below the equilibrium level of the spring. Since the central member 809 is electrically connected to the metal arm 801 by the metal stud 824, conductor 818 is normally connected to spring 801 when there is no pressure exerted on needle 815. When needle 815 strikes a hill on a hill-and-dale record, it endeavors to raise the entire structure above the level of the disc and this needle pressure is transmitted to the central member 809 which results in the transfer of contact 826 from plate 820 to plate 822 thus connecting conductor 817 to spring 801. The action of the switch is such that the above mentioned transfer takes place with a snap-action which is due to the fact that contact 826 is positively held against plate 820 as long as needle 815 does not exert the necessary critical pressure; eventually the force exerted by the needle disrupts this equilibrium, and, the springs 812 and 813, in their endeavor to find new equilibrium on the other side of the critical point, transfer contact 826 to the upper plate. The plates 820 and 822 are spaced from spring 809 much nearer than the above mentioned states of equilibrium, and, therefore, contact 826 is positively held either against plate 820 or plate 822, depending upon the pressure exerted on the needle 815. Fast, positive action of the switch is the result.

Figure 9:
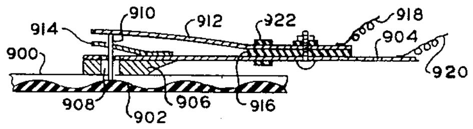

The advantage of the arrangement illustrated in Fig. 8, as applied to a phonograph reproducer, resides in the fact that only an exceedingly small travel of the reproducing needle 815 is necessary for transferring contact 826 either to its upper or lower position and the established contact is quite positive because of the action of the side springs 812 and 813. Therefore, the positiveness of the contact is not controlled primarily by the force exerted by the needle 815, but by the force exerted by the springs 812 and 813 which exceeds the force exerted by the needle many fold. The switch is illustrated with three conductors 801, 817 and 818; depending upon the modulation desired, either two or three conductors may be used for keying the modulator, and when "off and on" keying is desired either conductor 817 or 818 may be omitted. For a more detailed description of the action of the spring member 809, reference is made to the United States Patent Number 1,960,020;

Fig. 9 illustrates that type of arm which is particularly suitable for use in connection with an audio frequency record 900, the recorded frequency being illustrated in the figure as a hill-and-dale record 902. The reproducing arm is connected to its pivot by means of a metallic arm 904, which terminates in a block 906 normally sliding over the top of the record. The block is provided with an opening 908 for accommodating a reproducing needle 910 rigidly connected to a spring 912, the needle setting spring 912 into oscillation. Block 906 is provided with a spring 914 which is electrically connected to arm 904, thus connecting spring 914 to one side of the circuit to be keyed. Spring 912 is insulated from arm 904 by an insulating spacer 916 and is connected to the other side of the circuit by means of a conductor 918. When needle 910 sets spring 912 into oscillation, it makes and breaks electrical contact with spring 914, thus closing and opening the conductors 918 and 920. The natural period of the recorded frequency improves the vibrating action of the spring and positiveness of contact between the springs 912 and 914. The frequency and the amplitude of vibration of arm 912 may be adjusted by adjusting the position of clamp 922 which either shortens or lengthens the free end of the arm. Making and breaking of contact may be utilized in any well known manner in modulator 26.

Figure 10:
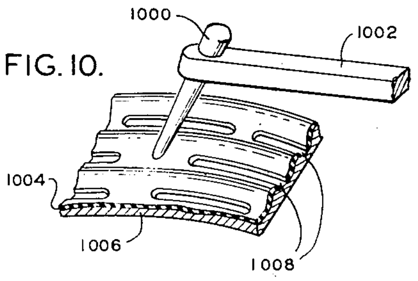
Figure 12:
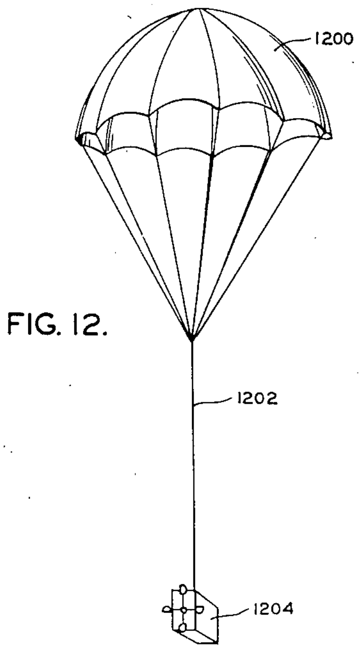
Figure 12 illustrates a parachute radiosonde.
Figure 11:
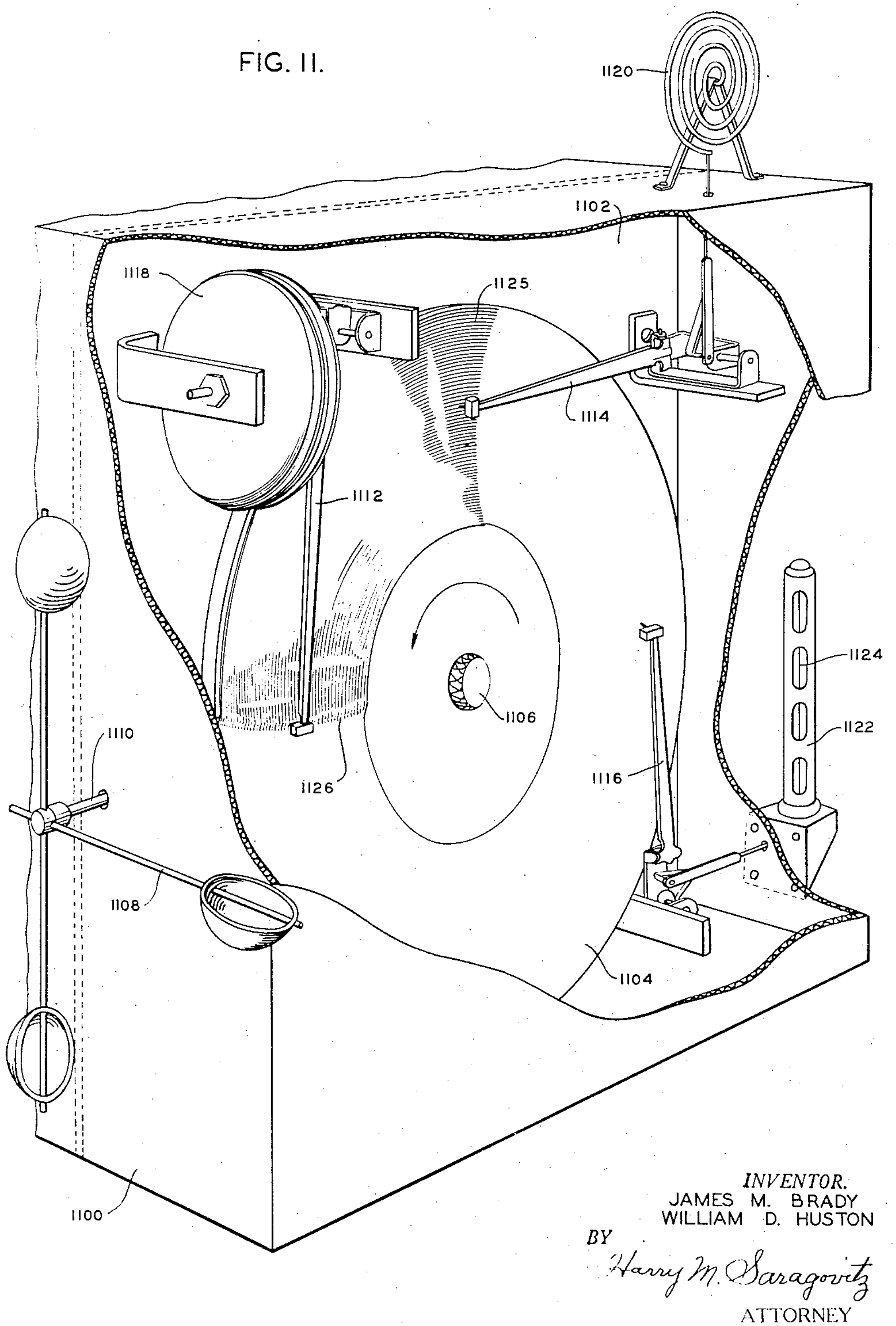
Figure 11 illustrates a perspective view of a radiosonde gondola with the radio transmitter-keyer compartment and the front wall of the disc compartment broken away.

Fig. 10 illustrates that type of record which opens and closes the electrical circuit by means of a reproducing needle 1000 connected to a metallic arm 1002, the arm and the needle representing one side of the circuit, while a conductive portion 1004 of the record represents the other side, conductor 1004 being deposited on a nonconductive portion 1006 of the disc in any well known manner. Either Baudot or Morse Code may be used for transmitting desired intelligence, the Morse Code being illustrated in the figure as engraved slits 1008. The functioning of the arrangement illustrated in Fig. 10 is apparent: arm 1002 and needle 1000 close the circuit to the modulator when the needle makes contact with the metal surface of the record and opens the circuit when it engages the engraved slits. The position of metal 1004 and of insulator 1006 may be reversed should it be preferable to make the slits in the insulator rather than the metal;

Fig. 11 illustrates a portion of the gondola used in connection with the radiosonde and one possible method of interconnecting the meteorological instruments with the disc. A box 1100 is used for housing the instruments, the disc, and the modulator-transmitter combination, the disc compartment being separated from the transmitter-modulator by means of a partition 1102, shielding the transmitter from interference signals. Disc 1104 is mounted in a vertical plane on a shaft 1106 connected to an anemometer cup-wheel 1108 by means of a shaft 1110, the wheel revolving the record. The illustrated radiosonde is particularly suitable for use with the radiosondes released from aeroplanes; the radiosondes are equipped with the parachutes and descend at fairly uniform velocity controlled by the parachute holding the radiosonde in a suspended position. This unform rate of descent through the air is used for rotating the anemometer wheel and the derived motive power is used for turning the disc. The three reproducing arms 1112, 1114, and 1116 are connected respectively to the pressure element 1118, consisting of a plurality of conventional aneroid cells, a temperature element consisting of a bimetallic spiral 1120, and a hygrometer unit 1122 consisting of a humidity-responsive hair element 1124. The mechanical linkages interconnecting the meteorological instruments with the arms are of conventional nature and need no special description. Suffice it to say that they amplify the movements of the elements and transform them into the angular movements of the arms. As previously mentioned in connection with the description of the raised sector record, the arms periodically engage the raised sector 1125 of the disc thus transmitting the intelligence signal for telemetrically indicating the readings of the respective instruments. As illustrated in the drawing, the arms are so positioned around the record that only one arm engages the raised sector of the disc at any given time, thus avoiding the possible source of confusion which may result should two arms engage the active sector simultaneously. In the drawing the active sector spans a sector of approximately 90°, and the arms are separated by an angle of 95°. The leading edge 1126 of the sector is curved to avoid side-swiping of the reproducing arms, as explained previously in connection with Fig. 4. The code combinations are present only on the raised sector of the disc, while the record grooves may or may not extend over the entire area of the disc depending upon whether it has been decided to use the grooves as well as the curved leading edge of the raised sector for avoiding the side-swiping action. The figure illustrates the disc with the grooves present only on the raised sector. Since the angle spanned by the sector is in the order of 90° and the three arms lag each other by approximately 59°, the three reproducing arms transmit their intelligence signals in seriatim with a 5° silence between the signals, and a 75° period of silence between the signals from the pressure unit and the hygrometer unit, this period of silence being used for identifying the order of the received signals and for referring them to the proper arms. Fig. 11 illustrated only three arms and it is for this reason that the raised sector is made to span approximately 90°. When the number of the reproducing arms is increased, the angle of the raised sector must be decreased in order to avoid simultaneous transmission of the intelligence signal by the two arms;

Fig. 12 illustrates new field of application of a radiosonde disclosed in Fig. 11. Because of the simplicity of its structure, and the simplicity of the code signals transmitted by the phonograph disc with a raised sector, the radiosonde of this type may be used for obtaining complete meteorological data over a territory which may not be used for sending the well-known upwardly ascending balloon radiosondes. When this is the case, the disclosed radiosonde is taken up to the desired height over the desired territory in an aeroplane, and is then released from the plane. The parachute 1200 opens, antenna 1202 unfolds, and the radiosonde unit 1204, which is illustrated in detail in Fig. 11, begins to transmit the previously described signals while it gradually descends to ground. The transmitted signals may be very readily recorded at the launching plane should the radiosonde be beyond the receiving range of any ground stations.

Figs. 11 and 12 disclose an anemometer wheel for revolving the record. It has been found that in some instances the anemometer wheel does not give a fairly uniform rotational speed, and, therefore, whenever more uniform angular velocity of the record is desirable it is preferable to replace it with a small permanent magnet synchronous motor.

The mechanical as well as the electrical simplicity of the disclosed combination, and its many advantages, should be apparent to those versed in the art from the given description. The signals transmitted by the disc, the reproducing arm, and the modulator are very positive, distinct signals which do not confuse the monitoring operator. The known radiosondes transmit variable audio frequency in accordance with the readings of the meteorological instruments. This audio frequency is measured by the frequency measuring circuit upon its reception by the ground equipment thus reconverting the frequency into the reading of the instrument at the receiver. Systems of this type are apt to introduce numerous errors since any variations in pressure, temperature and humidity, which obviously always take place when the radiosondes change their position, invariably influence in an unpredictable manner the parameters of the electrical circuits at the radiosondes thus changing the generated frequency. The same is true of the ground equipment which is also apt to introduce errors when the received frequency is measured. The disclosed system is free of all these errors; hence higher accuracy of measurements is obtainable with the disclosed system. Moreover, the ground equipment may now be simplified since an ordinary super-heterodyne receiver is suitable for receiving the transmitted signals. Therefore, in many instances a conventional, usually available communication receiver used for regular communication purposes may also be used for receiving the meteorological data. When this is the case, the specialized ground equipment per se disappears altogether or at most may require only a special UHF channel in the existing communication receiver which is used for general communication purposes.

The invention discloses a disc with a raised sector for transmitting the necessary meteorological data. Although this is the preferred form of the invention, the same results may be obtained with a cylinder equipped with a raised sector, similar to the cylinders used, for examle, with the "Dictaphones" except that, as mentioned above, the cylinder must be provided with the raised sector which performs the same function as the raised sector illustrated in the Figs. 2 to 6. When cylinders of this type are used in connection with the meteorological instruments, all reproducing arms must have linear rather than the angular motion so that the instruments move them along the path parallel to the axis of the cylinder. When the reproducing arms move linearly, the raised segment may have uniform diameter since the reproducing arms always engage the cylinder along the line parallel to the axis of the cylinder. When the arms swing along an arc, the raised sector may not have the uniform diameter any longer, and must conform with the path followed by the reproducing arm. Since this path is not parallel to the axis of the cylinder any longer, it is obvious that the diameter of the cylinder must gradually increase in proportion to the angle of swing of the reproducing arm and the degree of its departure from the normal position with respect to the axis of the cylinder. This type of record is obviously much more difficult to make than the one illustrated in the Figs. 2 to 6, and it is for this reason that the disc represents the preferred form of the invention.

No specific electrical circuits are disclosed in this specification which may be used in connection with the illustrated reproducing arms since enumeration of all possible combinations would unnecessarily burden this disclosure. Double modulation used with the radiosonde transmitters of today is also possible in connection with the disclosed arms making and breaking of the electrical contacts by the arms changing the time constant of the R.-C. combination in the grid circuit of the blocking oscillator interposed between the arms and the transmitting oscillator. For a more detailed description of suitable modulator-transmitter circuits of this type reference is made to an application for patent entitled "Radiosonde" by Leo S. Craig and Leon Hillman, Serial Number 552,854, filed September 6, 1944, now Patent No. 2,509,215. In order to obtain the desired audio frequency changes in the blocking oscillator with the reproducing arms illustrated in the drawings, a fixed resistance may be connected in series with the closing and opening contacts of the reproducing element.

It is believed that the construction and operation of the telemetering system disclosed in this specification, as well as the many advantages thereof, will be apparent from the foregoing description. It should be understood, therefore, that while we have shown and described our invention in several preferred forms, reasonable changes and modifications may be made by those skilled in the art without departing from the spirit of the invention as sought to be defined in the following claims.

We claim:

1. In a telemetering system, a rotatable phonograph disc with a raised sector and a plurality of distinguishable signals recorded on said raised sector, a plurality of reproducing arms with pick-up elements angularly disposed around said disc, the pick-up elements of one arm lagging the pick-up elements of the preceding arm by an angle at least as great as the angular dimension of said sector, a telemetered instrument connected to each arm for shifting the position of said arm with respect to said sector in accordance with the reading of said instrument when said arm is free of any engagement with said sector, means for rotating said disc whereby a reproducing engagement is established between one pick-up element at a time and said sector, for actuating said pick-up elements respectively with specific code signals corresponding to the positions of said elements relative to said sector, thus transforming said reading into said specific signals, and a transmitter connected to said pick-up elements for transmitting said specific signals, thereby remotely indicating the readings of said instruments.

2. A radiosonde including a rotatable phonograph disc with a raised sector and a plurality of distinguishable signals recorded on said raised sector, a plurality of reproducing arms with pick-up elements angularly disposed around said disc, the pick-up elements of one arm lagging the pick-up elements of the preceding arm by an angle at least as great as the angular dimension of said sector, a telemetered meteorological instrument connected to each arm for shifting the position of said arm with respect to said sector when said arm is free of any engagement with said sector in accordance with the response of said instrument to a meteorological condition, means for rotating said disc whereby a reproducing engagement is established between one pick-up element at a time and said sector for actuating said pick-up elements with specific signals corresponding respectively to the positions of said elements relative to said sector, thus transforming said responses into said specific signals, a modulator connected to and keyed by said pick up elements, and a transmitter connected to said modulator for transmitting said specific signals, thereby remotely indicating the responses of said instruments.

3. A phonograph record including a raised sector with an intelligence-bearing data recorded upon said sector, and concentrically grooved and downwardly curved surfaces on the leading and lagging edges of said sector, the leading edge surface facilitating a reproducing engagement of a reproducing arm with said sector without exerting any side-swiping force upon said arm, and the lagging edge surface facilitating a like disengagement of said arm with said sector.

4. A phonograph record including a raised sector with an intelligence-bearing record; a downwardly curved surface on the leading edge of said sector, and concentric grooves on said surface, said surface and said grooves facilitating a reproducing engagement of a reproducing arm with said sector without exerting any side-swiping force upon said arm.

5. A phonograph record including a raised sector with an intelligence-bearing record, and downwardly and radially curved surfaces on the leading and lagging edges of said sector, the radius of the radial curvature of said surface being equal to the radius of a reproducing arm used in connection with said record, said surface facilitating a reproducing engagement and disengagement of said arm with said sector with the aid of said surfaces without exerting any side-swiping forces by said surfaces upon said arm.

6. Radiosonde apparatus comprising a transmitter, a plurality of adjustable phonograph pick-ups, an operable phonographic record having individualized sound tracks bearing track-identifying signal recordings, said pick-ups and sound tracks being arranged relatively for the pick-up of recorded signals in time-spaced series, meteorological condition-responsive means each operatively connected to one of said pick-ups for adjusting the same into position for tracing a particular sound track in response to conditions affecting the respective condition-responsive means, and a circuit controllable by each of said pick-ups for effecting transmission by said transmitter of signals in series each identifiable by the time-spacing thereof from the preceding series and each signal of each series characterized by the identifying recordings of the sound tracks traced by the respective pick-ups.

7. A swingable reproducing arm and a phonograph record, said record including a raised sector with intelligence-bearing data, the leading edge of said sector being in the form of a downwardly sloping surface which is substantially arcuate in the plane of said sector, the radius of said arc being substantially equal to the swinging radius of said reproducing arm, so as to facilitate a reproducing engagement of said arm with said sector and to minimize side-swiping forces upon said arm when such engagement takes place.

8. A signal transmitting system including a phonograph disc, means to rotate said disc and a phonographic needle element, said disc including a substantially sector-shaped raised area joined to a substantially sector-shaped depressed area by inclined surfaces, said raised and depressed areas respectively being in first and second substantially parallel planes substantially perpendicular to the axis of said disc, a plurality of grooves on said raised area, groove identifying data recorded in each of said grooves, said needle being engageable with each of said grooves, means to prevent said needle from engaging with said depressed area, so that when said disc is rotated relative to said needle the needle engages with one of said grooves when said raised area is adjacent said needle and said needle is out of engagement with any part of said disc when said depressed area is adjacent said needle.

9. A signal transmitting system as defined in claim 8, which includes a pivoted pick-up arm to sustain said needle and allow it to move along a substantially arcuate path in a plane substantially perpendicular to the axis of said disc, and wherein the leading edge of said substantially sector-shaped raised area has substantially the same arcuate configuration as said arcuate path of said needle, so as to present a substantially perpendicular aspect to the needle at all operating positions of said needle to minimize side-swiping of said needle just before it engages in one of said grooves.

WILLIAM D. HUSTON.
JAMES M. BRADY.

REFERENCES CITED

The following references are of record in the file of this patent:

UNITED STATES PATENTS

| Number | Name | Date |
|---|---|---|
| 546,228 | Davis et al. | Sept. 10, 1895 |
| 1,090,816 | Henschel | Mar. 17, 1914 |
| 1,144,870 | Sohm | June 29, 1915 |
| 1,227,523 | Blessing | May 22, 1917 |
| 1,280,566 | Sherry et al. | Oct. 1, 1918 |
| 1,306,829 | Mellinger | June 17, 1919 |
| 1,621,939 | Lowe | Mar. 22, 1927 |
| 1,638,417 | Sperry | Aug. 9, 1927 |
| 1,752,357 | Wiener | Apr. 1, 1930 |
| 1,913,511 | Reynolds | June 13, 1933 |
| 1,964,317 | Fairchild | June 26, 1934 |
| 2,067,098 | Rogers | Jan. 5, 1937 |
| 2,156,368 | Reynolds | May 2, 1939 |
| 2,202,517 | Koevend | May 28, 1940 |
| 2,216,161 | Curtis et al. | Oct. 1, 1940 |
| 2,284,008 | Miller | May 26, 1942 |
| 2,318,646 | White | May 11, 1943 |
| 2,333,248 | Harvey | Nov. 2, 1943 |
| 2,347,160 | Wallace | Apr. 18, 1944 |
| 2,347,345 | Wallace | Apr. 25, 1944 |
| 2,409,155 | Schellens et al. | Oct. 8, 1946 |

FOREIGN PATENTS

| Number | Country | Date |
|---|---|---|
| 134,018 | Great Britain | May 16, 1919 |